United States Patent [19]

Jensen et al.

[11] Patent Number: 4,529,043
[45] Date of Patent: Jul. 16, 1985

[54] FOLDABLE IMPLEMENT WITH TRANSPORT LATCH

[75] Inventors: James K. Jensen, Ankeny; Robert E. Fox, Minburn, both of Iowa

[73] Assignee: Deere & Company, Moline, Ill.

[21] Appl. No.: 532,636

[22] Filed: Sep. 15, 1983

[51] Int. Cl.³ ............................................ A01B 73/00
[52] U.S. Cl. .................................. 172/776; 172/311; 172/466
[58] Field of Search ............... 172/311, 446, 447, 456, 172/466, 662, 776

[56] References Cited

U.S. PATENT DOCUMENTS

| | | | |
|---|---|---|---|
| 3,511,319 | 5/1970 | Hansen et al. | 172/662 |
| 3,811,516 | 5/1974 | Thompson et al. | 172/311 |
| 3,948,327 | 4/1976 | Parker et al. | 172/311 |
| 4,042,044 | 8/1977 | Honnold | 172/311 |
| 4,159,038 | 6/1979 | Eichenberger | 172/311 |
| 4,206,816 | 6/1980 | Richardson et al. | 172/311 |

Primary Examiner—Richard T. Stouffer

[57] ABSTRACT

A double latch system for maintaining an implement outrigger in a folded position, including a primary latch member which receives a locking pin to secure the outrigger in the raised position, and a pivoting secondary latch having a hooked end which automatically aligns with a latch pin when the locking pin is removed from a storage position for insertion into the primary latch. To lower the outrigger, the locking pin must first be removed from the primary latch, and the secondary latch hook must be pivoted and held away from the latch pin by lifting the secondary latch and inserting the locking pin in the storage position.

12 Claims, 6 Drawing Figures 4,529,043

FOLDABLE IMPLEMENT WITH TRANSPORT LATCH

BACKGROUND OF THE INVENTION

The present invention relates generally to agricultural implements having a main frame with a foldable outrigger frame pivotally attached thereto, and more specifically to a latch system for releasably securing the outrigger frame in a folded position.

Agricultural implements having one or more outrigger frames pivotally connected to a main frame for rocking by a hydraulic actuator between a lower field-working position and an upright storage or transport position are well-known in the art. Typically such implements include a brace or support connected to the main frame with a U-shaped member or clevis which receives a portion of the outrigger frame as the latter is rocked up toward the transport position. A lockup pin is then inserted through apertures in the ends of the legs of the clevis to lock the outrigger in the transport position. To lower the outrigger, the hydraulic actuator is activated to relieve any pressure on the lockup pin, and the pin is removed. The outrigger is then lowered to the surface of the ground. An example of the aforementioned type of device may be found in U.S. Pat. No. 3,967,684. Sometimes an operator will fail to follow the recommended established procedures and will not activate the hydraulic system to relieve the pressure on the pin before attempting to remove the pin from the clevis, which can make the pin difficult to remove and permit the outrigger to fall if force is used to remove the pin. Bypassing established procedures, the operator can therefore both endanger himself and cause damage to the equipment.

It is therefore an object of the present invention to provide an improved latching system for an outrigger of an agricultural implement.

It is another object of the present invention to provide an outrigger latching system which helps to prevent an operator from deviating from the recommended procedure for rocking the outrigger between field-working and transport positions.

It is a further object to provide an improved outrigger latching system which prevents any substantial rocking of the outrigger from the transport position if the transport lockup pin is removed before the hydraulic system is actuated to relieve pressure on pin.

These and other objects, features and advantages of the present invention will become apparent to those skilled in the art from the description which follows and from the drawings.

DESCRIPTION OF THE PREFERRED EMBODIMENT

Figure 1:
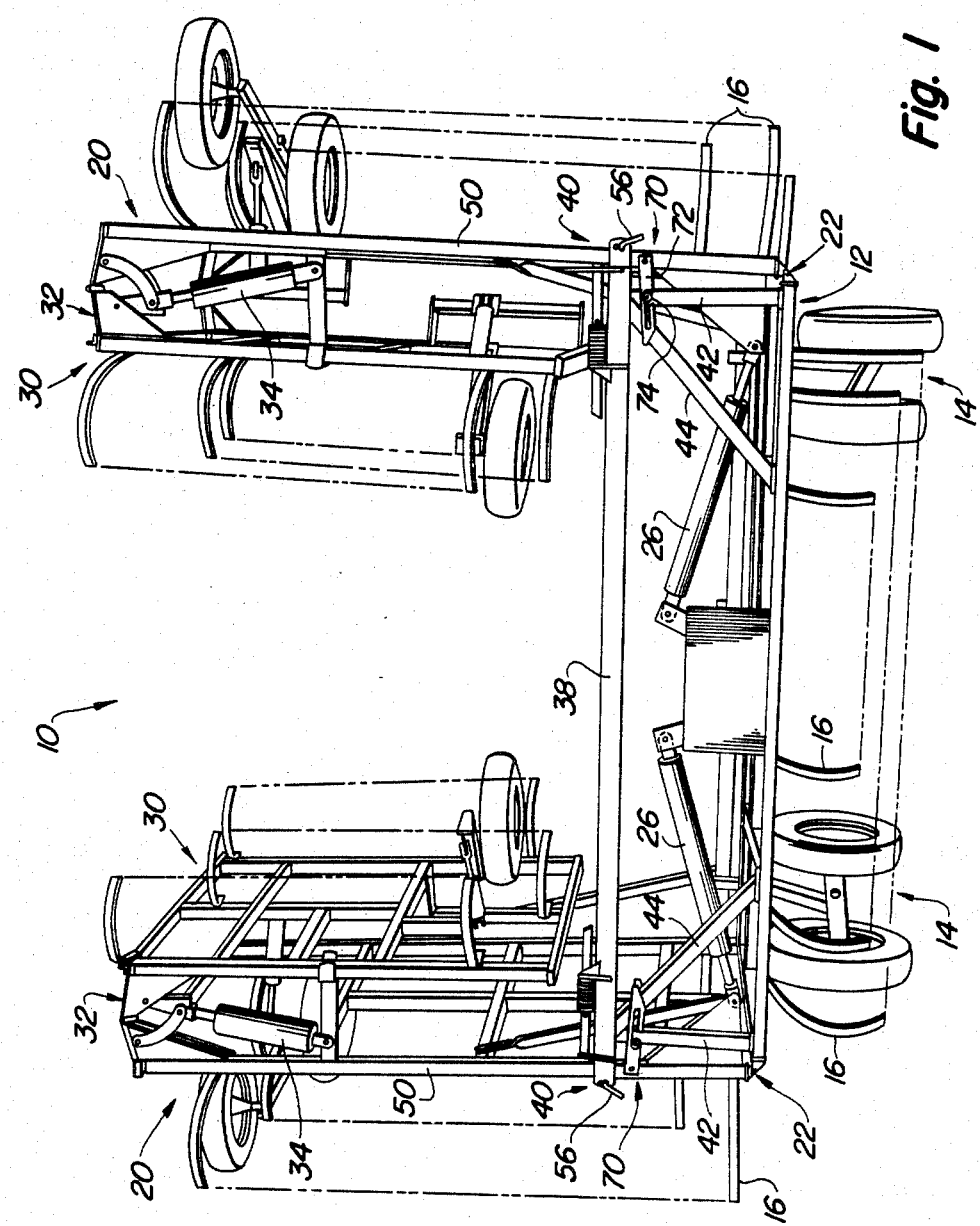
FIG. 1 is a rear perspective view of a multi-section implement in the folded transport position with the latch system of the present invention attached thereto.

Referring now to FIG. 1, therein is shown a multi-section implement 10 having a main transverse frame 12 supported for forward movement over the ground by a pair of wheel assemblies 14. The main frame 12 supports a plurality of transversely spaced earthworking tools 16 which can be raised and lowered with respect to the ground by rocking the wheel assemblies 14. An outrigger frame 20 is pivotally connected by hinge structure 22 to each end of the main frame 12 for rocking between a substantially vertical upright transport position (shown) and a generally horizontal field-working position wherein the main and outrigger frames are substantially parallel. A hydraulic cylinder 26 is connected between the main frame 12 and each outrigger frame 20 to rock the latter between the field-working and the transport positions. The implement shown in FIG. 1 is a five-section implement with additional wing sections 30 connected by hinge structure 32 to the outboard ends of the outrigger frames 20. Additional cylinders 34 are provided to fold each of the wings 30 approximately 180 degrees about the hinge 32 when the outrigger frame 20 is in the field-working position. A five-section machine is shown here for the purposes of illustration only, and it is to be understood that the present invention may be utilized with folding implements having any number of sections.

Figure 2:
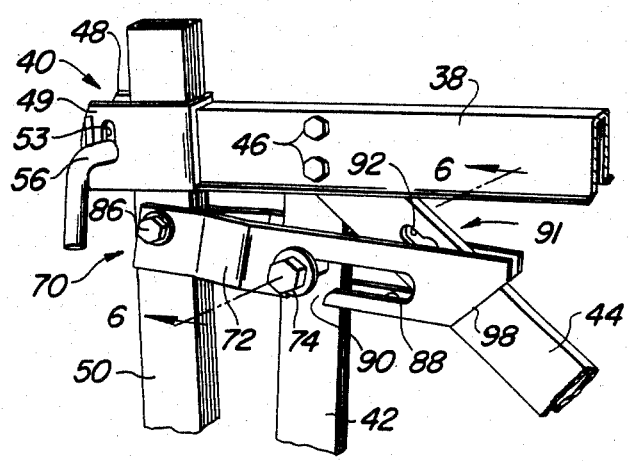
FIG. 2 is an enlarged view of a portion of the implement of FIG. 1 showing the latch system for one of the outrigger frames in the locked transport position.
Figure 3:
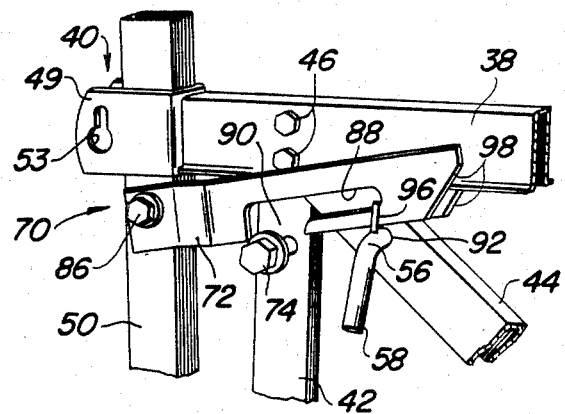
FIG. 3 is a view similar to FIG. 2 but showing the latch system with the transport locking pin in the storage position.
Figure 4:
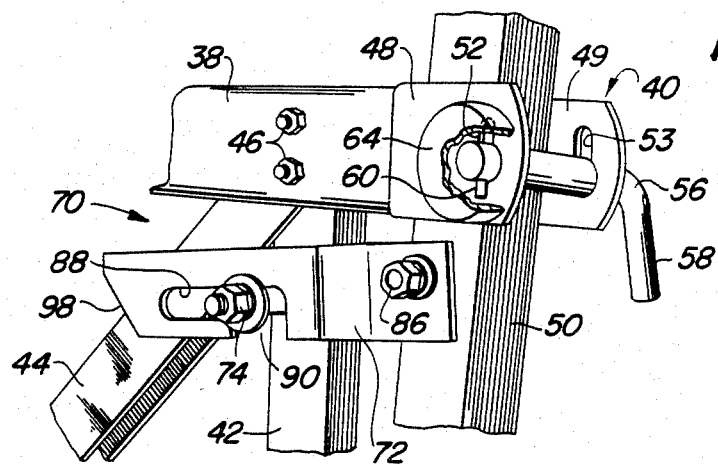
FIG. 4 is a front perspective view of the latch of FIG. 2.

A transverse brace 38 including a pair of U-shaped end brackets or clevises 40 is supported above the rear of the main frame 12 by upright support posts 42 and diagonal beam members 44 which are connected to the end of the brace 38 by bolts 46 (FIGS. 2-4).

The clevis 40 includes front and rear side legs 48 and 49, respectively, spaced apart sufficiently to receive a rectangular tubular beam 50, which forms the rear part of the outrigger frame 20, as the frame is rocked up to its transport position. Apertures 52 and 53 are provided near the ends of the side legs 48 and 49, respectively. When the hydraulic system on the towing vehicle is operated to retract the cylinders 26 and raise the outrigger frames 20 to their upright positions, each beam 50 retracts within the respective clevis 40 beyond the apertures 52 and 53. A transport locking pin 56 is inserted through the apertures of the clevis side legs 48 and 49 to secure the beam 50 in the upright position and therefore lock the outrigger frame 20 in the transport position. The locking pin 56 includes a handle 58, and the opposite end of the pin carries a retaining pin 60 (FIG. 4) angled generally in the same direction as the handle 58. The apertures 52 and 53 include upwardly directed slots for receiving the retaining pin 60 therethrough as the locking pin 56 is inserted with the handle 58 pointed in the upright direction. Once the retaining pin 60 passes the front side leg 48, the handle 58 is turned downwardly to maintain the pin 56 in the locking position. To remove the pin 56, the hydraulic cylinders 26 are retracted to relieve any pressure on the pin, and the pin is turned with the handle 58 pointing upwardly and pulled back out of the slots 52 and 53. To help prevent the pin 56 from being forced out of the clevis 40, a closed, cylindrically shaped end cap 64 is welded over the slot 52 on the front face of the side leg 48.

Figure 5:
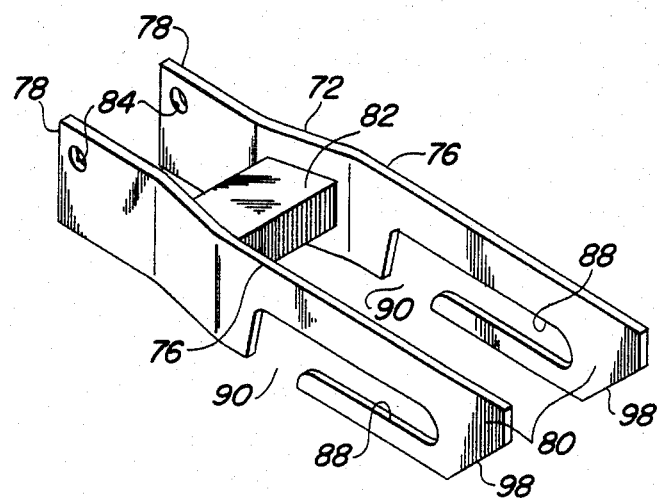
FIG. 5 is a perspective view of the secondary latch of FIG. 2.

Secondary latch structure 70 is provided for preventing substantial rocking of the outrigger frame 20 from the locked transport position downwardly toward the horizontal field-working position if the pin 56 is removed before the hydraulic cylinders 26 are actuated. The secondary latch structure 70 includes a pivoting member 72 connected to the beam 50 of the outrigger frame 20, and a pin member 74 connected to the support post 42 on the main frame 12. The pivoting member 72 includes a pair of side plates 76 (FIG. 5) with a connecting end 78 and a hooked end 80. A cross member 82 is welded between and spaces the side plates 76. The top portions of the connecting ends 78 are apertured at 84, and the pivoting member 72 is connected by a pivot pin 86 to the beam 50. The ends 78 are spaced sufficiently far apart so that the member 72 can freely pivot on the beam 50. However, the amount of pivoting motion of the member 72 is limited by the cross member 82 which contacts the top of the beam 50. The weight of the member 72 acting to the right (as seen in FIGS. 2 and 3) of the pivot 86 biases the member 72 toward a latching position wherein the hooked end is aligned with the pin member 74 when the outrigger frame 20 is in the upright transport position. The hooked end 80 of each side plate 76 includes a longitudinal slot 88 with a generally vertically extending entrance to the slot located at 90. As best seen in FIGS. 2 and 4, if the outrigger frame 20 is lowered with the member 72 in the latching position, the pin member 74 will ride into the longitudinal slot 88 and will be captured therein shortly after the outrigger begins pivoting downwardly. To unlatch the member 72 from the captured pin member 74, the operator must activate the hydraulic cylinder 26 to raise the outrigger frame 20 to the position shown in FIGS. 1 and 2 so that the vertical entrance 90 is aligned with the pin member 74, and then lift the pivoting member 72 to the unlatching position shown in FIG. 3. The diagonal beam 44 includes a transport lock pin storage area indicated generally at 91 in FIG. 2 having a hole 92 extending through the diagonal beam for receiving the locking pin 56. Once the cylinder 26 is activated to remove any tension that may exist between the pin 56 and the beam 50, the pin 56 is rotated approximately 180 degrees and removed from the apertures 52 and 53 and placed in the aperture 92 to maintain the pivoting member 72 in the unlatching position (FIG. 3). The aperture 92 in the storage area 91 is so located adjacent the pin member 74 that the pin 56 when inserted therein holds the member 72 in an upwardly pivoted position such that the bottom edges of the side plates 76 will pass over the pin member 74 and prevent capturing as the outrigger frame 20 is pivoted downwardly. A second retaining pin 96 is located on the handle end of the pin 56 and prevents the pin 56 from passing through the aperture 92 in the storage area 91.

Figure 6:
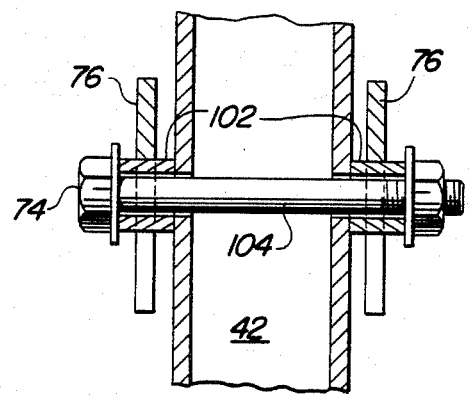
FIG. 6 is a sectional view taken along lines 6—6 of FIG. 2.

The hooked ends 80 of the side plates 76 are angled or ramped at location 98 so that as the outrigger frame 20 is raised from the field-working position toward the transport position (FIG. 3), the ramps 98 guide the member 72 up over the pin 56 which remains stored in the area 91 during field-working operations. The cross member 82 (FIG. 5) prevents the member 72 from rocking downwardly much beyond the position such as shown in FIGS. 2 and 4 so that the ramps 98 will contact the upper portion of the pin 56 as the outrigger frame 20 is rocked toward the transport position. Once the outrigger frame 20 is rocked to the transport position, the locking pin 56 is removed from the storage area 91 and is inserted through the apertures 52 and 53 of the clevis 40 to lock the outrigger in the transport position. Removal of the pin 56 from the hole 92 causes the member 72 to drop downwardly to the position shown in FIGS. 2 and 4. If the operator should remove the pin 56 from the clevis 40 before the hydraulic cylinders 26 are activated and the outrigger frame 20 begins to fall, the hooked ends 80 of the member 72 will catch the pin member 74 so that the frame 20 will rock only a limited amount before it is stopped by the secondary latch structure 70. The operator then must activate the cylinders 26 to move the outrigger frame 20 to its fully folded or upright position at which time the member 72 may be lifted and the pin 56 inserted in the storage area 91 to hold the hooked end of member 72 in a position wherein the longitudinal slots 88 will not engage the pin member 74 (FIG. 3). As best seen in FIG. 6, the pin member 74 includes a pair of spacers 102 secured against opposite faces of the support post 42 by a bolt 104.

Having described the preferred embodiment, it will be apparent that modifications can be made without departing from the scope of the invention as defined in the accompanying claims.

We claim:

1. In a foldable agricultural implement having a transverse main frame, an outrigger frame pivotally connected to one end of the main frame for rocking between a generally horizontal field-working position and an upright transport position, and activator means for rocking the outrigger frame between the field-working and transport positions, a transport latch system comprising:

primary latching means, including an insertable and removable transport locking pin, for securing the outrigger in the transport position when the pin is inserted while when the pin is removed permitting the outrigger to rock downwardly from the transport position;

structure for storing the transport locking pin in a storage position on the implement when said pin is removed to permit downward rocking of the outrigger frame;

releasable secondary latching means for preventing substantial rocking of the outrigger frame from the transport position toward the field-working position, when the transport locking pin is removed, until the secondary latching means is released, said secondary latching means including captivating means for preventing releasing of said secondary latching means until the activator means is activated to rock the outrigger frame to the upright transport position.

2. The invention as set forth in claim 1 wherein the secondary latching means comprises a first member rockably connected to one of the main and outrigger frames for rocking between latching and released positions and biased toward a latching position when the outrigger frame is in the upright position, a second member located on the other of said frames for receiving the first member when in the latching position and wherein the storage structure is located adjacent said first member and holds the locking pin in contact with the first member to urge it against the bias toward the released position away from the second member when the outrigger frame is in the upright position and the locking pin is in the storage position.

3. In a foldable agricultural implement having a transverse main frame, an outrigger frame pivotally connected at one end of the main frame, and actuator means for rocking the outrigger frame between a generally horizontal field-working position and an upright transport position, a transport latch system comprising:

a first latching member including removable pin means for releasably securing the outrigger frame in the upright transport position;

a second latching member biased toward a locking position when the outrigger frame is in the upright position, wherein in the locking position the second member prevents substantial rocking of the outrigger frame from the transport position; and storage means located adjacent the second latching member for storing the pin means in a storage position when the pin means is removed to release the outrigger frame, said pin means in the storage position contacting the second member to hold said second member against the bias away from the locking position to permit the outrigger frame to be rocked by the actuator means toward the field-working position, whereby substantial rocking of the outrigger frame away from the transport position is prevented until the pin means is removed from the first member and stored in the storage position.

4. The invention as set forth in claim 3 wherein the first latching member comprises a U-shaped support connected to the main frame for receiving a portion of outrigger frame when the latter is in the upright position, the U-shaped portion including legs having apertured ends for receiving the pin means therethrough, said pin means including a straight shank portion with a handle located at one end of the shank, and cap means covering the aperture which receives the opposite end of the shank covering said opposite end when the pin means is inserted through the apertures.

5. The invention as set forth in claim 3 wherein the second latching member is pivotally connected to the outrigger frame and extends inwardly therefrom when in the transport position, said member biased downwardly by gravity and including a hooked end, and wherein the main frame supports a pin member aligned with the hooked end when the latching member is in the locking position.

6. The invention as set forth in claim 5 wherein the hooked end includes ramp means for guiding the latching member over the pin member as the outrigger frame is raised to the transport position.

7. The invention as set forth in claim 5 wherein the hooked end comprises a plate member with elongated slot means for capturing the pin member as the outrigger rocks away from the transport position with the latching member in the locking position.

8. The invention as set forth in claim 7 including means for preventing movement of the latching member to the unlatching position while the pin member is captured in the slot.

9. The invention as set forth in claim 8 wherein the slot includes an entrance area aligned with the pin member when the outrigger frame is in the transport position.

10. In a foldable agricultural implement having a transversely extending main frame, an outrigger frame hingedly connected to one end of the frame for rocking between horizontal field-working and upright transport positions, hydraulic actuator means for rocking the outrigger between the transport and field-working positions, and a brace member connected to the main frame and receiving a portion of the outrigger frame when the latter is rocked toward the transport position, a latching system comprising:

a pin member located on one of the frames and a latching member located on the other of the frames, said latching member including a slot having an entranceway aligned with the pin member when the outrigger frame is in the transport position, means for biasing the latching member to a first position wherein the pin member is located in the entranceway and rocking of the outrigger frame away from the transport position moves the slot and pin member into engagement preventing any further rocking of the outrigger frame;

pin means having a locking position for selectively locking the outrigger frame in the transport position to the brace member; and storage means located adjacent the pin member on the respective frame for storing the pin means in a storage position when the outrigger frame is unlocked from the transport position, said pin means when in the storage position biasing the latching member to a second position and preventing the slot from engaging the pin member so that the outrigger may be rocked downwardly by the hydraulic actuator to the field-working position.

11. The invention as set forth in claim 10 wherein the brace member includes a clevis and wherein the pin means in the locking position is inserted through the clevis, and the brace member is connected by a support structure to the main frame, said storage means comprising an apertured section of the support structure, and wherein the pin member is connected to the support structure adjacent the aperture.

12. In a foldable agricultural implement having a transverse main frame, an outrigger frame pivotally connected to one end of the main frame for rocking between a generally horizontal field-working position and an upright transport position, a transport latch system comprising:

latching means, including an insertable and removable transport locking pin, for securing the outrigger in the transport position when the pin is inserted while when the pin is removed permitting the outrigger to rock downwardly from the transport position;

structure for storing the transport locking pin in a storage position on the implement when said pin is removed to permit downward rocking of the outrigger frame; and means for preventing substantial rocking of the outrigger frame from the transport position until the transport locking pin is placed in the storage position, wherein the means for preventing outrigger rocking comprises a first member rockably connected to one of the main and outrigger frames for rocking between latching and unlatching positions and biased toward the latching position when the outrigger frame is in the upright position, a second member located on the other of said frames for receiving the first member when in the latching position and wherein the storage structure is located adjacent said first member and holds the locking pin in contact with the first member to urge it against the bias towards the unlatching position away from the second member when the outrigger frame is in the upright position and the locking pin is in the storage position.

* * * * *